United States Patent [19]

Le Van Suu

[11] Patent Number: 5,998,769
[45] Date of Patent: Dec. 7, 1999

[54] DEVICE FOR THE CONTROL OF AN ELECTRICAL MACHINE

[75] Inventor: Maurice Le Van Suu, Romainville, France

[73] Assignee: SGS-Thomson Microelectronics S.A., Saint Genis, France

[21] Appl. No.: 08/754,413

[22] Filed: Nov. 22, 1996

[30] Foreign Application Priority Data

Nov. 30, 1995 [FR] France ................................ 95 14185

[51] Int. Cl.$^6$ ..................................................... H05B 1/02
[52] U.S. Cl. ......................... 219/506; 219/501; 219/497; 395/900; 323/235
[58] Field of Search ..................................... 219/497, 492, 219/506, 505, 501, 412, 413; 364/474.08, 474.06; 395/900; 323/235, 236, 319

[56] References Cited

U.S. PATENT DOCUMENTS

| | | | |
|---|---|---|---|
| 5,148,977 | 9/1992 | Hibino et al. | 236/49.3 |
| 5,243,732 | 9/1993 | Koharagi et al. | 395/900 |
| 5,287,154 | 2/1994 | Nakai et al. | 355/285 |
| 5,311,268 | 5/1994 | Ohzeki et al. | 355/285 |
| 5,386,099 | 1/1995 | Has | 219/413 |
| 5,410,890 | 5/1995 | Arima | 62/228.4 |
| 5,619,614 | 4/1997 | Payne et al. | 395/3 |
| 5,640,231 | 6/1997 | Mitsui et al. | 399/335 |
| 5,659,479 | 8/1997 | Duley et al. | 364/474.08 |

FOREIGN PATENT DOCUMENTS 0 633 515   1/1995   European Pat. Off. .

OTHER PUBLICATIONS

French Search Report from French Patent Application No. 95 14185, filed Nov. 30, 1995.

*Primary Examiner*—Mark Paschall
*Attorney, Agent, or Firm*—Wolf, Greenfield & Sacks, P.C.

[57] ABSTRACT

Disclosed is a device for controlling the operation of a machine comprising at least one measurement sensor, one circuit to control this operation as a function of a signal sent out by the sensor and one input for the supply of alternating electrical power to the machine. This control device includes a memory known as a program memory containing a set of membership functions, a set of decision rules and a fuzzy logic program, a fuzzy logic processor used to prepare a decision signal that depends on the signal sent out by the sensor, on these membership functions and on these rules all at the same time and that is used to activate the operation of this machine with this decision signal, and in the program memory, additional membership functions that take account, as variables, of the signals available at the electrical supply input and of the rules that take account of these membership functions. The disclosure can be applied to devices for the control of electrical machines.

30 Claims, 4 Drawing Sheets

DEVICE FOR THE CONTROL OF AN ELECTRICAL MACHINE

BACKGROUND OF THE INVENTION

1. Field of the Invention

The present invention relates generally to a device for the control of any electrical machine. More particularly, the present invention relates to regulation control devices or regulation devices. It also relates to machines that are electrically supplied and are, moreover, controlled by a control circuit, with an additional function being added on to this control circuit for these electrical machines.

The invention shall be described with respect to an example where the machine is an electrical radiator. However, it could be any other machine such as a domestic electrical appliance or an industrial machine, having the specific feature of being electrical, supplied by means of an electrical supply (for example the mains) and also possessing a control circuit.

2. Discussion of the Related Art

In the field of the control of electrical machines, especially radiators, there are known ways of carrying out the control functions with electronic circuits, especially electronic circuits including processors or microprocessors associated with program memories and peripheral control circuits. In the field of electrical radiators, there is especially the known circuit called UAA2016 by Motorola that enables the regulation of the thermal power dissipated by a radiator as a function of a measurement of the ambient temperature and an instructed value or set value of temperature indicated by a user through a control button. In practice, the temperature sensor is a CTN type resistor, i.e. with a negative temperature coefficient.

These resistors have the drawback of undergoing variations over time (through the aging of the component). For example, at the end of several years, the signal delivered by the resistor is no longer the same as it was at the outset. Furthermore, a problem of non-linearity arises. To overcome these drawbacks, the above-mentioned circuit includes the possibility of taking account of another resistor of the same type, placed at another position in the vicinity of the radiator (generally at the bottom of the radiator) so as to compensate for the variations or cases of non-linearity. This approach has the drawback wherein the device made is costly because the CTN type resistors are themselves costly in that they have components of the greatest possible linearity. It also has the drawback of requiring lengthy and painstaking research and design work in order to devise the regulation transfer function piloted by this circuit. Indeed, this transfer function depends to a great extent on the geometry of the radiator and especially on the position of the CTN detection resistors at the different places in the radiator. This method also entails one inevitable problem: it does not take account of the size of the room and of the place in the room in which the radiator is located. The circuit concerned, when it fulfills its regulation function, delivers a signal that is transmitted to a circuit for turning on the thermal resistors of the radiator. This circuit for turning on the resistors is ultimately the load circuit of the regulation signal, namely the command signal.

An additional problem arises when, apart from a system of regulation imposed by an operator on a concerned radiator, it is sought to pilot a general heating installation so as to make it work in different modes of operation: for example a comfort mode, during which the temperature, in Celsius, in an entire house should be about 19° or 20°, an economical mode during which this temperature should be from 10° to 15° corresponding to periods when the house is inhabited but when there is no one within: for example between 10:00 AM and 4:00 PM for people who have gone to work. It may also be desired to have a so-called minimum "no-freeze" mode corresponding to situations in which there is no one in the house but when, in order to protect the plumbing, it is important not to allow the house to freeze: a minimum temperature of 7° is then set. Finally, there may be an OFF mode in which the installation is permanently stopped and, whatever the commands applied to each of the radiators, they cannot start producing heat.

The circuit referred to here above is not capable of managing this so-called piloting information. Hence, it has become common practice to add an additional microcontroller to this regulation circuit, the signal of which is ultimately a signal to enable or to modify the working of the above-mentioned circuit. This additional microcontroller, by means of a wire known as a pilot wire, receives the information coming from the general control system of the house through which the user lays down a general mode of operation. In practice, the pilot wire may be a wire or a bus, the essential point being that it should convey the information on the mode of operation.

It can then be seen, in this case, that the processing of the information from the pilot wire by the microcontroller takes priority over the regulation carried out by the above-mentioned circuit. The regulation time constant is longer than the duration of the reception of remote control information from the pilot wire which is, firstly, short and, secondly, random. For example, the information from the pilot wire may have a duration of 20 milliseconds. In this case the microcontroller system will be handling an interruption operation. In addition to the obligation of adding the microcontroller, this device remains costly owing to the presence of the two CTN type resistors.

Furthermore, a new standard, in particular the European standard ICE 555-1/2/3, imposes a limit on the value of the reactive impedance generated by the untimely consumption of electrical current from the mains. Indeed, when the voltage is turned on in a machine, it is possible that the phase of the mains will correspond to a voltage or current antinode. Under these conditions, the current drawn is very great and, owing to various types of electrical consumption, gives rise to a distortion of the signal existing in the mains. This distortion leads to the presence of harmonics, notably third harmonics (at 150 Hz) that are detrimental to the working of the generators producing electricity or electromagnetic radiation and to the presence of parasitic phenomena that disturb the operation of neighboring electrical machines. To circumvent this drawback, the accepted method is to see to it that the electrical machines are activated preferably when the electrical current of the mains passes through zero.

In the context referred to here above, in addition to the random character of the control information or instruction from the pilot wire, there is now the need to take account of the instant at which the mains supply passes through zero. This will ultimately contribute to further complicating the control circuit of the machine, namely the circuit for controlling the radiator in the case being described herein. Furthermore, just as the instruction from the pilot wires may be considered to take priority over the regulation control information or instruction, so is it now no longer possible to consider the control information or instruction related to the passage through zero of the electrical supply current as taking priority over the instruction from the pilot wires. Indeed, the fact of taking one instruction into account may, if priority is given to it, prevent the other instruction, which would be delivered simultaneously, from being taken into account.

Hence, the problem to be resolved is not only that of adding another microcontroller which would be used to manage another problem but also that of managing, at the same time, the problems of temporal conflict that may arise owing to the simultaneous nature of the two instructions. In general, this will also be the case when it is desired to provide a known type of operation of any machine with a first additional instruction and a second additional instruction.

SUMMARY OF THE INVENTION

An object of the invention is to overcome these problems. In the invention, it has been decided to restate the problem in a completely different way. Rather than making a specific circuit of the type referred to here above, the devising of which is furthermore a laborious process, it has been chosen to make a fuzzy logic type of circuit. It will be shown that, with a fuzzy logic circuit of this kind made in this way, it is possible to overcome the problem related to variations or to non-linearity in sensors. It is then possible to have only one temperature sensor. The variations undergone by the sensor will be managed by the fuzzy logic program implemented by the circuit.

Furthermore, the management of a remote control information element, for example of the pilot wire type or of the type using synchronization with the passage of the voltage through zero, is taken into account in the invention quite simply by the adding of a set of membership functions related to the presence of the new information element to be processed: this is the information from the pilot wire or the information pertaining to passage through zero. In other words, the information from the pilot wire or pertaining to the passage through zero will be processed as one of the variables also managed by the fuzzy logic circuit.

The fuzzy logic circuit comprises a set of rules of the type: "if the result of a sensor is in a given state then the result of the instruction must be in a given state" which will be complemented, in the invention, by a rule of the following type: "if the sensor is in a given state, and if the information from the pilot wire (or pertaining to the passage through zero) is in a given state, then the instruction must be in a given state". This general procedure makes it possible to take account quite naturally of as many external constraints as desired. Naturally, it is possible to combine the presence of the temperature sensor, the presence of the information from the pilot wire and the presence of the sensor for detecting the passage through zero of the supply current. It will be shown hereinafter that the choice of this approach makes it possible to take account very simply of the most varied situations for the most varied machines.

The invention therefore relates to a device for controlling the operation of a machine comprising at least one measurement sensor, one circuit to control this operation as a function of a signal sent out by the sensor and one input for the supply of alternating electrical power to the machine, wherein the control device comprises:

a memory known as a program memory containing a set of membership functions, a set of decision rules and a fuzzy logic program (which correspond to a fuzzy logic model of the system described), a fuzy logic processor used to prepare a decision signal that depends on the signal sent out by the sensor, on these membership functions and on these rules all at the same time and that is used to activate the operation of this machine with this decision signal, and in the memory called the program memory, additional membership functions that take account, as variables, of the signals available at the electrical supply input and of the rules that take account of these membership functions.

BRIEF DESCRIPTION OF THE DRAWINGS

The invention will be understood more clearly from the following description and from the accompanying figures. These figures are given purely by way of example and in no way restrict the scope of the invention. Of these figures.

DETAILED DESCRIPTION

Figure 1:
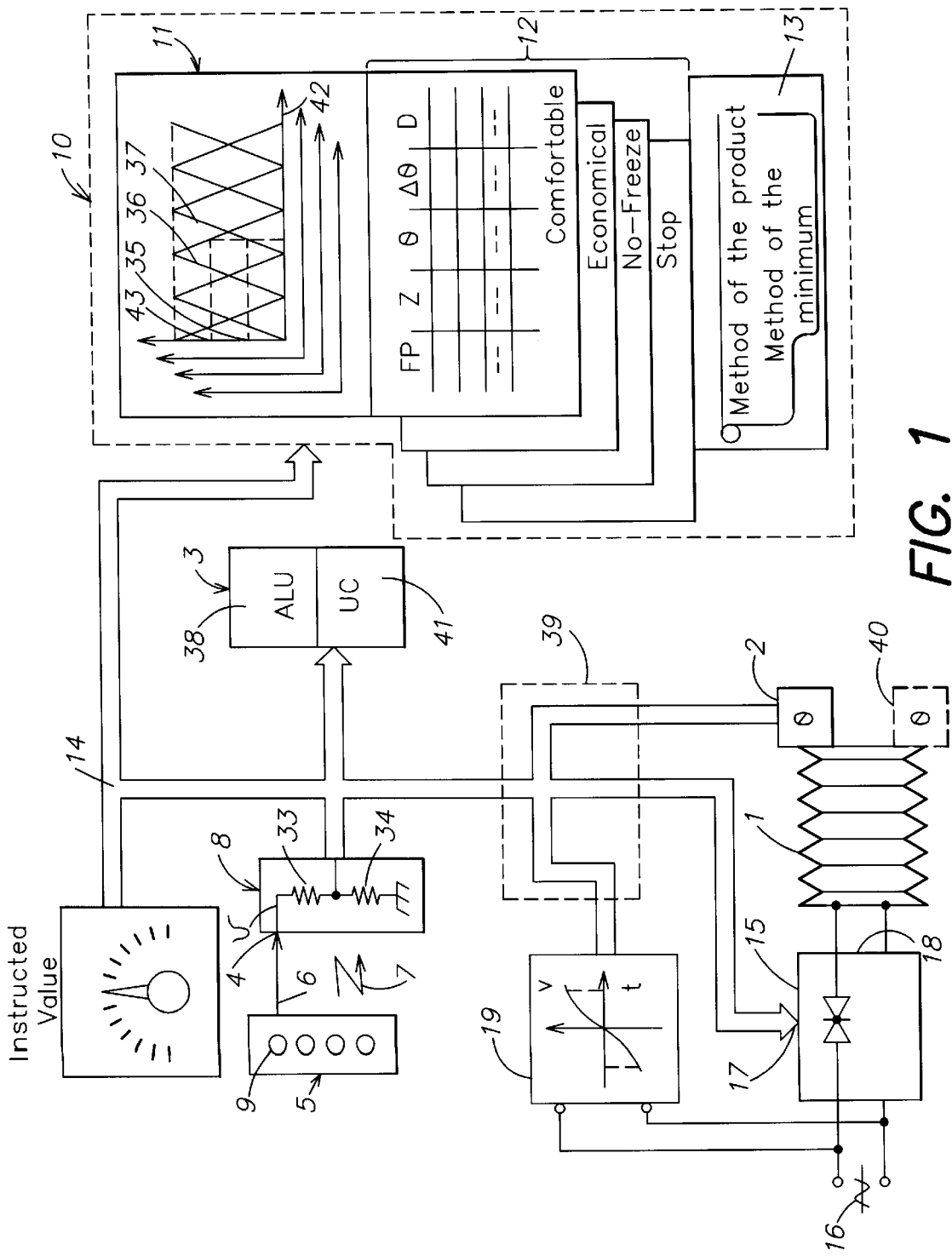
FIG. 1 shows a device to control the working of a machine according to the invention.

FIG. 1 shows a device to control the working of a machine. In the present case, the machine is a radiator 1. The device comprises chiefly a measurement sensor. In this case, to simplify the description, it is a sensor 2 of temperature Θ, for example a CTN type resistor attached to the top of the radiator. Its signal takes account of the temperature of the top of the radiator and the ambient temperature in the upper region of this radiator. The control device furthermore comprises a circuit to control this operation. In the example shown, the control circuit comprises a microprocessor 3, essentially provided with a arithmetic and logic processing unit as well as other associated elements that shall be seen further below. The control device also comprises a mode-changing instruction input 4 to receive a mode-changing signal. In one example, the mode-changing signal is delivered by a control pack 5 with an electrical connection 6 or electromagnetic connection 7 to a circuit 8 for taking account of the mode-changing instruction. The pack 5 has a set of buttons such as 9 to deliver the mode-changing signal appropriate to the mode chosen. In the prior art, the signal from the pack 5 reached a microcontroller. The output of the microcontroller activated the working of the abovementioned regulation circuit.

In the invention, the control device furthermore has a program memory 10 that contains a set 11 of membership functions, a set 12 of decision rules and a fuzzy logic program 13 corresponding to the fuzzy logic model of the system.

The microprocessor 3 of the control circuit is a fuzzy logic processor used to prepare a decision signal. This decision signal is a function of the signal emitted by the sensor 2 and is a function, by application of the fuzzy logic program, of the set 11 of membership functions and of the set 12 of decision rules. As shall be seen further below, the membership functions include membership functions related to the presence of information pertaining to the pilot wire and the decision rules take account of the value of these membership functions to prepare the result, namely the decision signal.

These circuits are connected to one another by a bus 14 which, to simplify the explanation, will be used to convey the addresses, the data elements and the instructions all at once. The bus 14 is furthermore linked with a circuit 15 for putting the machine 1 into operation. Should the machine 1 be a heating radiator, the circuit 15 will quite simply comprise a set of triacs whose switching will be organized as a function of the power to be dissipated with the radiator 1. Should the machine 1 be a motor, the circuit 15 could be a circuit to convert the decision information into a series of time-modulated pulses (of the PWM type). In practice, the circuit 15 is connected to the electrical mains 16, receives the decision signal at an input 17 and delivers, at output 18 electrical power needed for the chosen mode of operation of the machine 1.

The device of the invention also has a circuit 19 for detecting the passage through zero of the supply current. The circuit 19 is a known type of circuit. It is represented herein by a set of symbols showing the passage through zero of the alternating voltage V as a function of the time t. In a known way, this circuit will have a rectifier circuit or preferably an analog-digital converter capable of converting the mains alternative signal into a digital information element which may be positive or negative depending on the half-wave. The circuit 19 will also have a comparator to compare the absolute value of the signal delivered by the analog-digital converter and to deliver a signal corresponding to the difference between this absolute value and this reference value. This difference is eliminated when it is positive (corresponding to the periods when the absolute value of the voltage is greater than the reference). It is taken into account with the sign of the half-wave when it is below this value. The signal delivered by the circuit 19 is conveyed under the same conditions by the bus 14 and corresponds, in the set 11 of the membership functions, to membership functions of the type that take account of the zero value of voltage. In the set 12 of rules it corresponds to a condition relating to the value of these membership functions.

Figure 2A:
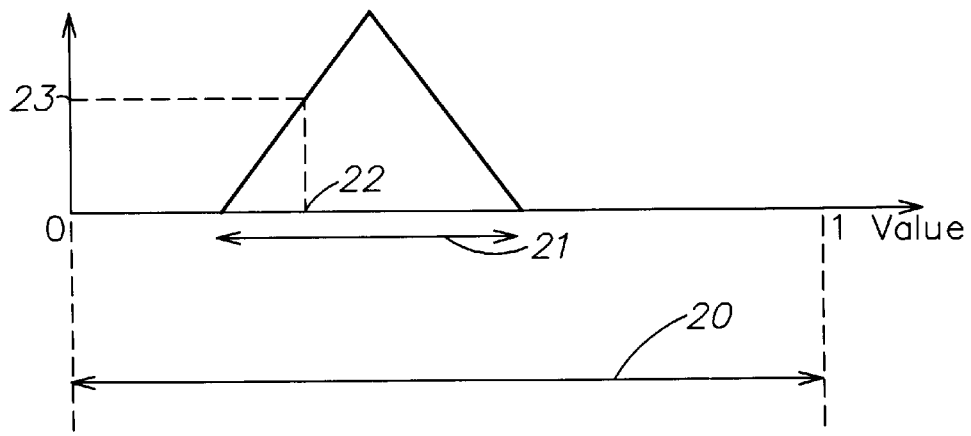
FIGS. 2a and 2b exemplify the shape of a membership function.
Figure 2B:
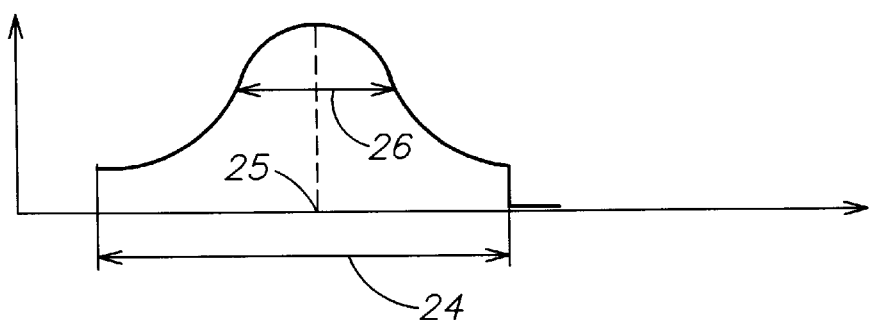

FIGS. 2a and 2b show shapes of possible membership functions. FIG. 2a gives a view, for a total dynamic range 20 of a value ranging between two limits, for example in this case between zero and one, of a limited span or scale of values 21. The dynamic range 20 of zero to one is in fact a standardized dynamic range. To this end, for each measurement sensor, the ratio of the value measured to the total value of the dynamic range of measurement will be taken. The standardization is not a necessity but in many cases it may be more practical for the implementing of the method of the invention. Indeed, in this case, the shapes of the membership functions may themselves be standardized.

A membership function is a curve revealing the relationship between an x-axis value which is a measurement value and a y-axis value which is a membership coefficient. This curve is qualified by a phenomenon that it represents: for example a phenomenon of heat called "hot" or "very hot". For each measured value, it is possible, by referring to the curve, to determine a membership coefficient. The membership coefficient is then a quantification of a statement according to which an object for which the value has been measured is assumed to belong to the phenomenon, namely to a scale. For example, it will be said that, for an object producing the value 22, the coefficient of membership in the membership function related to the scale 21 has a value 23. The membership functions have isosceles, scalene or other shapes and the coefficients have zero values outside the scale and a maximum value for a given value. The result membership functions have a mean value or a barycenter with a weighting coefficient related to the surface and to the position of the membership function.

FIG. 2a shows the shape of the membership function used for the measurement sensors as well as, preferably, for the management of the instructed value, the management of the information from the pilot wire or the management of the passage through zero of the voltage. FIG. 2b shows another shape of a membership function in the form of a truncated Gaussian curve contained in a scale 24 with a mean value 25 and a standard deviation 26. In certain cases, when the transfer function to be simulated is highly non-linear, it will be preferred to use truncated Gaussian shapes for the result membership functions. In other cases, triangular shapes will be preferred. Depending on their shape, they enable a better appreciation of the decision to be applied, taking account of the measurements made.

Figure 3A:
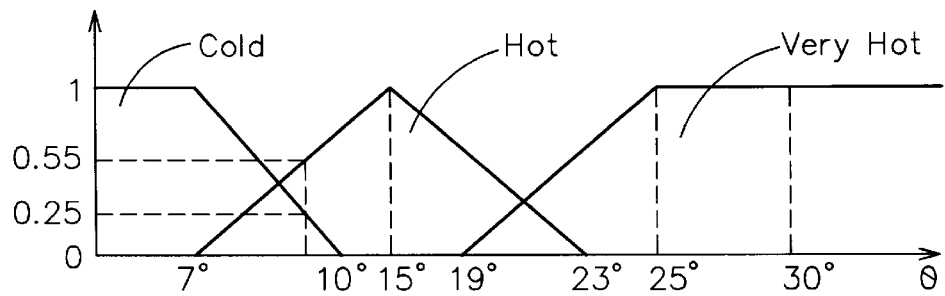
FIGS. 3a to 3c exemplify membership functions respectively of the temperature variable, a different temperature variable and the variable pertaining to the control of the machine.
Figure 3B:
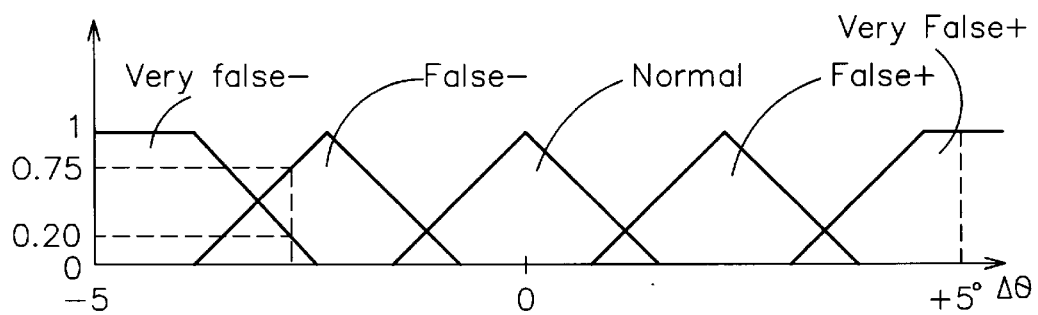
Figure 3C:
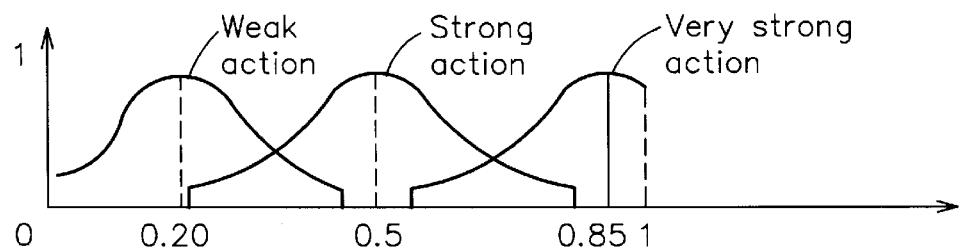

FIGS. 3a to 3c give a view of a partial implementation of the device of the invention. FIG. 3a shows the membership functions of the measurement of temperature. In particular, it shows a first function called a "cold" function, a second function called a "hot" function, and a third function called a "very hot" function. The first so-called "cold" function with a right trapezium shape indicates that, below a temperature of 7°, it will be said that it is "cold" with certainty, the coefficient being equal to 1, whereas between 7° and 10° it will be said that it is cold with a certainty decreasing proportionally with the changing of the temperature between 7° and 10°. The membership function in terms of temperature known as the "hot" function indicates that it will be considered to be hot, with a coefficient ranging from 0 to 1, when the temperature measured goes from 7° to 15°, then with a coefficient decreasing from 1 to 0 when the temperature goes from 15° to 23°. The third membership function indicates that it will be considered to be very hot with a coefficient ranging from 0 to 1 and then always 1 when the temperature changes from 19° to 25° and then from 25° to 30°.

FIG. 3b pertains to the taking into account of the instructed value entered by a user into the radiator before him or into the machine that he seeks to instruct. This instructed value may be taken into account as such. Or it may be taken into account by difference with respect to the value measured by the sensor. In the example shown in FIG. 3b, it would have been preferred to show the difference existing between the value that the user wishes to set as an instructed value and the value indicated by the sensor. This value may then belong to membership functions known as normal, false−, false+, very false− or very false+. In the example, the shapes are those shown in FIG. 3b, the maximum tolerable deviation being about 5°.

FIG. 3c shows decision membership functions indicating that the action to be performed may be a weak action, a strong action or a very strong action. As indicated here above, the membership functions of the decisions, hence of the actions, have truncated Gaussian shapes. While the FIGS. 3a and 3b have non-standardized values on the X-axis expressed in degrees, FIG. 3c has standardized values ranging from 0 to 1.

Figure 4A:
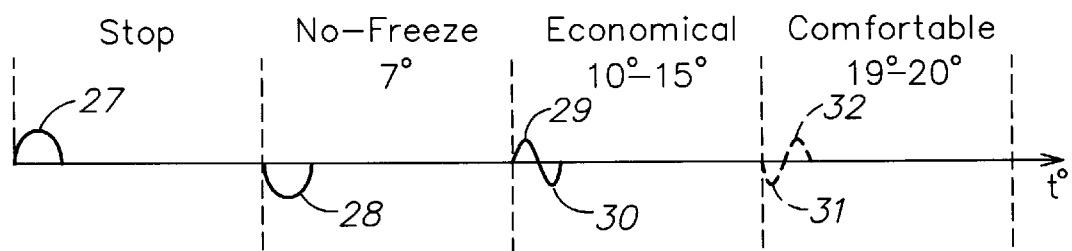
FIGS. 4a to 4c show schematic views of a preferred example of the membership functions respectively of the pilot wires and of the passage through zero of the supply voltage.
Figure 4B:
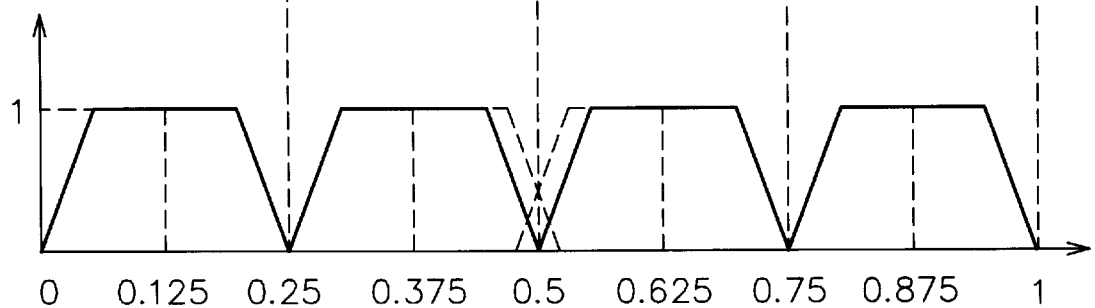

According to the invention (FIGS. 4a to 4c), the information elements given by the pilot wire (FIGS. 4a, 4b) or by the detection of the passage through zero of the electrical supply voltage (FIG. 4c) will now be taken into account on an additional basis. FIG. 4a provides an indication, on the X-axis and with respect to a changing of temperature t°, of the scales corresponding to modes of operation of the machine. It also shows a shape of the signal from the pilot wire corresponding to each mode. FIG. 4b illustrates these elements by quantifying the pilot wire signal between 0 and 1. It will be ascertained that, for a first scale of this signal, where the value of the variable is from 0 to 0.25, the mode of operation will be an off mode. In a second scale from 0.25 to 0.5, the mode of operation is a so-called no-freeze mode corresponding to a condition where the temperature of the room and generally of the building is kept at above 7°. In a third scale in which the values of the variables are from 0.5 to 0.75, the mode will be the economical mode in which the temperature of the building should be from 10° to 15°. In the fourth mode, for values of variables going from 0.75 to 1, the building will be kept at a temperature ranging from 19° to 20° (or at any other temperature indicated by the user).

The circuit 8, which takes account of the mode change instructions, shall now be described in a simplified way. The mode change instructions are normally standardized. The change-over into the OFF mode is normally dictated by the dispatch, on the pilot wire 6, of a positive pulse 27. The changing of the mode into no-freeze mode is obtained by the dispatch, on the same wire 6, of a negative pulse 28. The change-over into economical mode is obtained by the dispatch of a positive pulse 29 followed by a negative pulse 30. The change-over into comfort mode may be either automatic (resulting from a time-lag), or achieved by the dispatch, on the pilot wire 6, of a negative pulse 31 followed by a positive pulse 32. The circuit 8 will have a decoder to decode the appearance of these pulses. This decoder circuit will be capable, in one example, of producing a voltage v applied to a divider bridge of resistors 33, 34 (represented herein schematically). The midpoint of the divider bridge of resistors may then deliver a voltage signal which, once standardized, will range from 0 to 1, and preferably have mean values equal to 0.125, 0.375, 0.625, 0.875. To take account of the variations of these resistance values or rather of the tolerance of their variation in value during the making of the bridge, it is also possible for the membership functions to overlap. For example, it has been shown, by means of dashes, that the no-freeze membership function overlaps the economical membership function in such a way that the sum of the membership coefficients of these two membership functions is always equal to 1. In other words, the so-called pilot wire information element is an information element delivered by the circuit 8 ranging from 0 to 1 depending on the value of the signal coming from the pack 5.

Figure 4C:
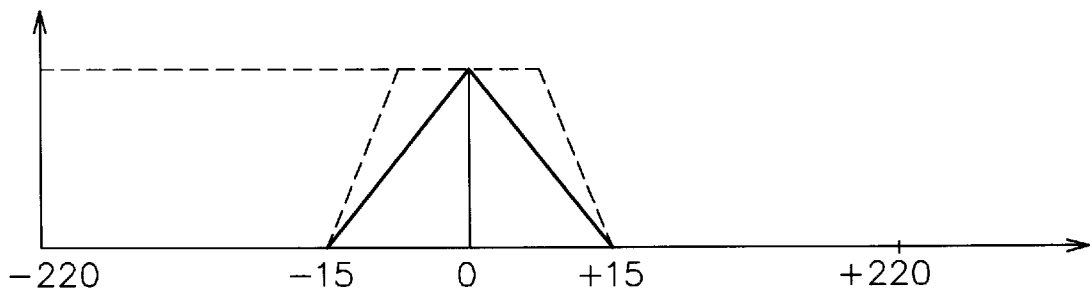

FIG. 4c shows a single membership function corresponding to the taking into account of the passage through zero of the electrical supply signal of the machine. According to this membership function, the membership coefficient is significant (different from zero) only if the electrical supply signal ranges, for example, from −15 volts to +15 volts (for a measurement of voltage). If the current is measured, a value of intensity of the useful electrical signal will be determined.

Two shapes of the membership function have been shown: a triangular shape according to which the coefficient passes linearly from zero to one and from one to zero depending on whether the voltage goes from −15 to zero and then from zero to 15, and a trapezoidal shape. These two shapes of membership function have effects whereby the information is taken into account with varying degrees of suddenness: either of these shapes will be chosen depending on the constraints to which the operation is subjected, especially the constraints of harmonic distortion of the electrical supply signal.

The working of the device of the invention is as follows. In operation, the instructed value signal, the signal delivered by the sensor 2, the signal delivered by the circuit 8 and the signal delivered by the circuit 19 are transmitted to the microprocessor 3. This transmission is accompanied by all the usual conversions: analog-digital conversion, standardization if the need for it is felt as well as multiplexing if the bus 14 is a common bus: each input sends its data elements in turn. Each of these data elements is then used in the membership functions that concern it. In practice, each data element is equivalent to an X-axis position 33 giving rise to the assessment of the membership coefficients, herein 34 and 35 respectively, of the membership functions, 36 and 37 respectively, for which these coefficients are not zero. For example, the coefficient 34 will be equal to 0.66 while the coefficient 35 will be equal to 0.33. This assessment is quite simply a reading of a table in which the address is the value of the measurement (the data element transmitted to the microprocessor 3) and in which the value read is the corresponding membership coefficient.

With this being established, since the coefficients 0.33, 0.66, etc. too are computed if necessary by the arithmetic and logic unit 38 of the microprocessor 3, the operation will pass to the assessment of the corresponding control signal that must be applied by the circuit 15 to the machine 1. This assessment requires the taking into account of a certain number of rules contained in the set of rules 12. The rules are of the type, to simplify the description, wherein if the temperature $\Theta$ measured is hot (see FIG. 3a), and if the temperature divergence is false− (see FIG. 3b), then the action to be undertaken (the decision D) should be a weak action. Indeed, in this case, it is not necessary to apply very great heat since the temperature divergence is small. Another rule may be the following: if the temperature measured belongs to the cold membership function and if the temperature divergence with respect to the instructed value indicates a very false− membership function, then the action to be generated will be either a strong action or possibly even a very strong action. And so on and so forth. It can be seen that, for two input signals, herein the measurement of temperature and indirectly the instructed value (since the difference is taken between the instructed value and the measured temperature), there are a certain number of situations. If it is assumed that there are M membership functions for the measurement of temperature and N membership functions for the measurement of the divergence, there will be a total of M×N possible situations. In other words, the system will lead to the establishment of M×N rules. In the present case, there are fifteen rules since M equals 3 and N equals 5.

What the invention provides additionally is the fact that the information from the pilot wire is taken into account. Since this pilot wire information (FIG. 4b) may only have four membership functions, it means having four sets of M×N=15 rules giving a total of sixty rules. In FIG. 1, the sets of rules possible are indicated: comfort, economical, no-freeze, or off depending on the goal to be achieved.

Similarly, the taking into account of the passage through zero of the supply will be done by the modification of the set of rules. Thus the membership function of FIG. 4c is a membership function called authorization because, around zero, the activation of the machine is allowed whereas, when the voltage is outside this scale close to zero, the starting of the machine will not be allowed. Then, in the sixty rules referred to, the set of rules comprises an additional condition: whether or not, in addition, the variable pertaining to the measurement of the passage through zero of the supply voltage belongs to the authorization membership function. It will then be enough to add a sixty-first rule indicating that, when the variable of measurement of the passage through zero of the supply voltage does not belong to the authorization membership function, the decision will be to do nothing.

We shall now see how the machine 1 is controlled in practice with this organization of membership functions and rules. The membership functions or rules may be programmed manually in the memory 10 or may be the result of a simulation made by a set of machines of the type 1. They may also be the result of a processing operation performed by the software known as WARP by SGS THOMSON MICROELECTRONICS. The fuzzy logic may then be implemented according to several methods, especially according to what is called a method of the product or a method of the minimum. A description of the method of the minimum shall be given, it being known that there are other existing methods designed to enable the preparation of a decision signal.

The method of the minimum includes taking account only of the rules for which the coefficients of membership in the functions designated in the rule are zero. For example (FIG. 3*a*), if the temperature measured is equal to 9.5°, the coefficient of membership of the phenomenon in the cold membership function will be 0.25. It will be 0.55 in the hot membership function. If, moreover, the temperature divergence is a divergence of 4°, negatively, such that this divergence belongs to the very false– membership function with a coefficient 0.75 and to the false– membership function with the coefficient 0.20; and if furthermore, to simplify the description, the pilot wire information belongs to the economical membership function with the coefficient 1 and the passage through zero function belongs to the authorization membership function with the coefficient 1, there will be four rules that will be implicated. The operation will be concerned with the cold and very false– rule, the cold and false– rule, the hot and very false– rule and the hot and false– rule. In the cold and very false– rule, the coefficients involved are 0.25 for the cold membership function and 0.75 for the very false– membership function. The minimum coefficient for this rule is therefore 0.25 (the coefficient relating to the cold membership function). It will then be said that the cold and very false– rule should lead to a strong action with a coefficient of 0.25. The rule involving the hot membership function (with a membership coefficient of 0.55) and the very false– membership function with a membership coefficient of 0.75 will itself involve a strong action with a coefficient that is the minimum of the two: in this case 0.55. And so on and so forth for the four rules, there will be respectively obtained results of very strong action with a coefficient of 0.25, strong action with a coefficient of 0.55 and so on and so forth. To find out the value of the decision signal proper, the mean value of the decision membership functions is multiplied by the coefficient chosen. For example, for the strong action, the mean value is 0.5. For the weak action, the mean value is 0.2. For the very strong action, it is 0.85. The product of these mean values multiplied by the minimum coefficients is then added up and the sum is divided by the number of rules involved. There is obtained a decision signal having a value, and this value is used in a circuit 15 to control the machine 1.

FIG. 1 also gives a view, in dashes, of a circuit 39 interposed on the bus 14 to enable a link between the machine and the microprocessor 3. The circuit 39 is preferably a coupling cell using carrier current capable of the reception, by carrier current, of the signal delivered by the CTN thermistor 2, possibly by another compensation thermistor 40 (which in any case can be set up also in the device of the invention), the signal produced by the circuit 19 to detect the passage through zero and capable, on the contrary, of the transmission, in the other direction, of the decision signals to be applied to the input 17 of the circuit 15. The cell 39 may furthermore be managed autonomously or managed by a control unit 41 of the microprocessor 3 which furthermore controls all the elements of its environment.

In view of the consumption prompted by the microprocessor 3 and in view of the fact that there is made a circuit 19 for the passage through zero of the supply voltage, the signal delivered by this circuit is used also to turn off the microprocessor 3 during periods when this signal is close to zero. Making this microprocessor 3 dormant is not a problem because, when it is revived, the only thing that it has to do is to find, among the membership functions of the set 11, membership functions of the values of the corresponding coefficients. In practice, this is the reading of tables having as many tables as there are scales of membership functions for the different variables. In the example referred to up till now, there are a total of ten tables. In one example, the memory 10 is a 1 kilobyte memory. Hence, the microprocessor 3 must carry out ten reading operations and, with the results of these ten reading operations, it must apply them to sixty-one rules. The method of the minimum described leads to the performance of an operation of accumulation on a limited number of rules, four or five in general, and the performance of a division (which can be done without if necessary). These operations may be performed by the microprocessor 3 at very high speed. For example, for a microprocessor working at a rate of 11 MHZ, this result may be acquired in less than about a hundred cycle periods, i.e. in practice in less than 10 microseconds. In practice, the microprocessor 3 will be allowed to perform these operations for about 100 microseconds and it will be cut off for the rest of the 20 milliseconds that correspond to the half-wave of the electrical supply signal (at 50 Hz). Consequently, the consumption of this electronic control will be reduced by a ratio of 100/20,000: 200 times as compared with the situation prevailing when it worked all the time.

The mode of management of the passage through zero of the supply voltage is particularly advantageous in a so-called "burst" mode of use, in which the control of the machine, once activated, will last a number of periods. The burst standard even stipulates that a number of periods will be that corresponding to a 41-second use. After this, the machine is cut off. Hence, the circuit 15 is capable, in receiving a decision at its input 17, of activating the burst mode accordingly. In this case, the deactivation of the microprocessor 3 may last throughout these 41 seconds.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A device for controlling the operation of a machine, comprising:

at least one measurement sensor to provide at least one measurement signal;

a first circuit to determine a passage through zero of a supply of alternating voltage to the machine and to provide a first signal;

a second circuit to activate the machine, the second circuit having an input to receive a decision signal and an output to deliver a control signal to the machine;

a program memory containing:

a set of membership functions to operate on the at least one measurement signal;

an authorization membership function to operate on the first signal;

a set of decision rules to operate on the set of membership functions to formulate the decision signal;

an authorization decision rule to operate on the authorization membership function to further formulate the decision signal, the authorization decision rule setting the decision signal to instruct the second circuit to activate the machine only when the authorization membership function indicates that the supply of alternating voltage is near the passage through zero; and a fuzzy logic program to operate the device using the set of membership functions, the authorization membership function, the set of decision rules and the authorization decision rule, based on a fuzzy logic model of a system that includes the machine; and a fuzzy logic processor to receive the at least one measurement signal and the first signal as input signals, to execute the fuzzy logic program, and to output the decision signal to the second circuit.

2. The device according to claim 1, further comprising:

a mode-changing input to the fuzzy logic processor to change a mode of operation of the machine;

at least one additional membership function in the program memory to operate on the mode-changing input; and at least one additional decision rule to operate on the at least one additional membership function to formulate the decision signal.

3. The device according to claim 1, further comprising:

a third circuit to place the processor in a dormant state when the supply of alternating voltage is near the passage through zero.

4. The device according to claim 1, wherein:

the at least one measurement sensor is a temperature sensor; and the machine is a heating radiator.

5. The device according to claim 4, wherein there is only one temperature sensor.

6. The device according to claim 1, further comprising a coupling cell that uses a carrier current to couple the fuzzy logic processor to the at least one measurement sensor, the first circuit, and the second circuit.

7. The device according to claim 1, wherein:

the input signals to the fuzzy logic processor include at least one additional input signal; and for each additional input signal, the program memory further includes:

an additional membership function to operate on the additional input signal; and an additional decision rule to operate on the additional membership function to formulate the decision signal.

8. The device according to claim 2, wherein the at least one additional membership function depends on a difference between a signal from the at least one measurement sensor and a mode-changing signal at the mode-changing input.

9. The device according to claim 1, wherein the authorization decision rule sets the decision signal to instruct the second circuit to activate the machine only when the authorization membership function indicates that the supply of alternating voltage is within a range of plus or minus 7% of a peak voltage from the passage through zero.

10. A device for controlling an electrical machine, comprising:

at least one sensor to produce at least one measurement input signal;

a first circuit to detect a passage through zero of an alternating electrical supply to the machine and to provide a first input signal;

fuzzy logic means, coupled to the at least one sensor and the first circuit to receive the at least one measurement input signal and the first input signal, for providing a decision signal to control the machine based on the at least one measurement input signal and the first input signal; and a second circuit to activate the machine, the second circuit having an input to receive the decision signal and an output to deliver a control signal to the machine;

wherein the fuzzy logic means includes means for providing the decision signal to instruct the second circuit to activate the machine only when the alternating electrical supply is near the passage through zero.

11. The device according to claim 10, wherein the fuzzy logic means includes means for compensating for variations and non-linearities of the at least one sensor.

12. The device according to claim 10, wherein the fuzzy logic means comprises:

a memory containing:

a fuzzy logic program to operate the device based on a fuzzy logic model of a system including the machine;

a set of membership functions to operate on the at least one measurement and first input signals; and a set of decision rules to operate on the membership functions to formulate the decision signal; and a fuzzy logic processor to execute the fuzzy logic program and output the decision signal.

13. The device according to claim 12, wherein at least one of the set of membership functions simulates a non-linear transfer function.

14. The device according to claim 13, wherein at least one of the set of membership functions has a truncated Gaussian shape.

15. The device according to claim 10, wherein the means for providing the decision signal instructs the second circuit to activate the machine only when the alternating electrical supply is within a range of plus or minus 7% of a peak voltage from the passage through zero.

16. The device according to claim 12, further comprising:

a mode-changing input to the fuzzy logic processor to change a mode of operation of the machine;

at least one additional membership function in the memory to operate on the mode-changing input; and at least one additional decision rule to operate on the at least one additional membership function to formulate the decision signal.

17. The device according to claim 16, further comprising:

a third circuit to place the processor in a dormant state when the alternating electrical supply is near the passage through zero.

18. The device according to claim 17, further comprising a coupling cell that uses a carrier current to couple the processor to the at least one sensor, the first circuit, and the second circuit.

19. A method for controlling an electrical machine, comprising steps of:

sensing at least one characteristic of the machine;

sensing a passage through zero of an alternating electrical supply to the machine; and employing fuzzy logic processing to activate the machine based on the at least one characteristic and the passage through zero in a manner that minimizes an electrical current initially drawn by the machine from the alternating electrical supply.

20. The method according to claim 19, wherein the step of employing fuzzy logic processing includes a step of employing fuzzy logic processing to activate the machine only when the alternating electrical supply is near the passage through zero.

21. The method according to claim 20, wherein the step of employing fuzzy logic processing includes a step of employing fuzzy logic processing to activate the machine only when the alternating electrical supply is within a range of plus or minus 7% of a peak of the electrical supply from the passage through zero.

22. The method according to claim 19, wherein the step of employing fuzzy logic processing includes steps of:
   providing at least one measurement signal corresponding to the at least one characteristic;
   providing a zero-cross signal corresponding to the passage through zero;
   employing a set of membership functions to operate on the at least one measurement signal and the zero-cross signal;
   employing a set of decision rules to operate on the set of membership functions;
   formulating a decision signal based on the set of decision rules; and
   using the decision signal to activate the machine.

23. The method according to claim 22, wherein the step of formulating a decision signal includes a step of executing a fuzzy logic program to process the set of membership functions and the set of decision rules to produce the decision signal, based on a fuzzy logic model of a system that includes the machine.

24. The method according to claim 22, further including steps of:
   providing a second input signal corresponding to a mode-changing condition;
   providing in the set of membership functions at least one additional membership function to operate on the second input signal; and
   providing in the set of decision rules at least one additional decision rule to operate on the at least one additional membership function.

25. The method according to claim 24, further including a step of:
   disabling fuzzy logic processing when the alternating electrical supply is near the passage through zero.

26. A device for controlling an electrical machine, comprising:
   at least one sensor to provide at least one sensing signal;
   a zero-cross circuit to detect a zero-crossing of an alternating electrical supply to the machine and to provide a zero-cross signal;
   a switch to activate the machine; and
   fuzzy logic means for controlling the switch based on the at least one sensing signal and the zero-cross signal such that the switch activates the machine to minimize an electrical current initially drawn by the machine from the alternating electrical supply.

27. The device of claim 26, wherein the fuzzy logic means includes control means for controlling the switch to activate the machine only when the alternating electrical supply is near the zero-crossing.

28. The device of claim 27, wherein the control means activates the machine only when the alternating electrical supply is within a range of plus or minus 7% of a peak of the electrical supply from the zero-crossing.

29. The device of claim 26, further comprising a remote mode-changing device to change a mode of operation of the fuzzy logic means.

30. The device of claim 29, further comprising a timing circuit to disable the fuzzy logic means when the alternating electrical supply is near the zero-crossing.

* * * * *